(12) United States Patent
He et al.

(10) Patent No.: US 11,807,236 B2
(45) Date of Patent: Nov. 7, 2023

(54) COORDINATING APPARATUS AND METHOD BETWEEN ADAPTIVE CRUISE CONTROL AND PREDICTIVE CRUISE CONTROL

(71) Applicant: International Engine Intellectual Property Company, LLC, Lisle, IL (US)

(72) Inventors: Chaozhe He, Lisle, IL (US); Brendan Chan, Aurora, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 163 days.

(21) Appl. No.: 17/354,930

(22) Filed: Jun. 22, 2021

(65) Prior Publication Data
US 2022/0402487 A1    Dec. 22, 2022

(51) Int. Cl.
*B60W 30/14*    (2006.01)
*B60W 30/16*    (2020.01)
*B60W 50/00*    (2006.01)
*B60W 40/06*    (2012.01)

(52) U.S. Cl.
CPC .......... *B60W 30/143* (2013.01); *B60W 30/16* (2013.01); *B60W 40/06* (2013.01); *B60W 50/0097* (2013.01); *B60W 2554/802* (2020.02); *B60W 2554/804* (2020.02)

(58) Field of Classification Search
CPC .... B60W 30/143; B60W 30/16; B60W 40/06; B60W 50/0097; B60W 2554/802; B60W 2554/804
See application file for complete search history.

(56) References Cited

U.S. PATENT DOCUMENTS

| | | |
|---|---|---|
| 7,711,468 B1 | 5/2010 | Levy |
| 2002/0016665 A1 | 2/2002 | Ulyanov |
| 2011/0282558 A1* | 11/2011 | Park ............... B60W 30/18054 701/94 |
| 2017/0291605 A1* | 10/2017 | Grewal ............... B60W 30/188 |
| 2020/0324768 A1* | 10/2020 | Switkes ............. B60W 30/162 |

* cited by examiner

*Primary Examiner* — Aniss Chad
*Assistant Examiner* — Nikki Marie M Molina
(74) *Attorney, Agent, or Firm* — Mark C. Bach; Umang Khanna

(57) ABSTRACT

A Coordinating Apparatus and Method is provided between Adaptive Cruise Control (ACC) and Predictive Cruise Control (PCC). The ACC system is configured to provide a target acceleration or deceleration based on maintaining a target distance from vehicles ahead. The PCC system is configured to provide a target acceleration or deceleration based on upcoming changes in elevation and maximizing fuel economy. The coordinating apparatus communicates with the ACC system and with the PCC system, and applies the lesser acceleration or greater deceleration between the ACC target acceleration or deceleration and the PCC target acceleration or deceleration. The apparatus and method may apply the target acceleration or deceleration by way of a vehicle speed control apparatus, such as a vehicle engine controller.

15 Claims, 1 Drawing Sheet

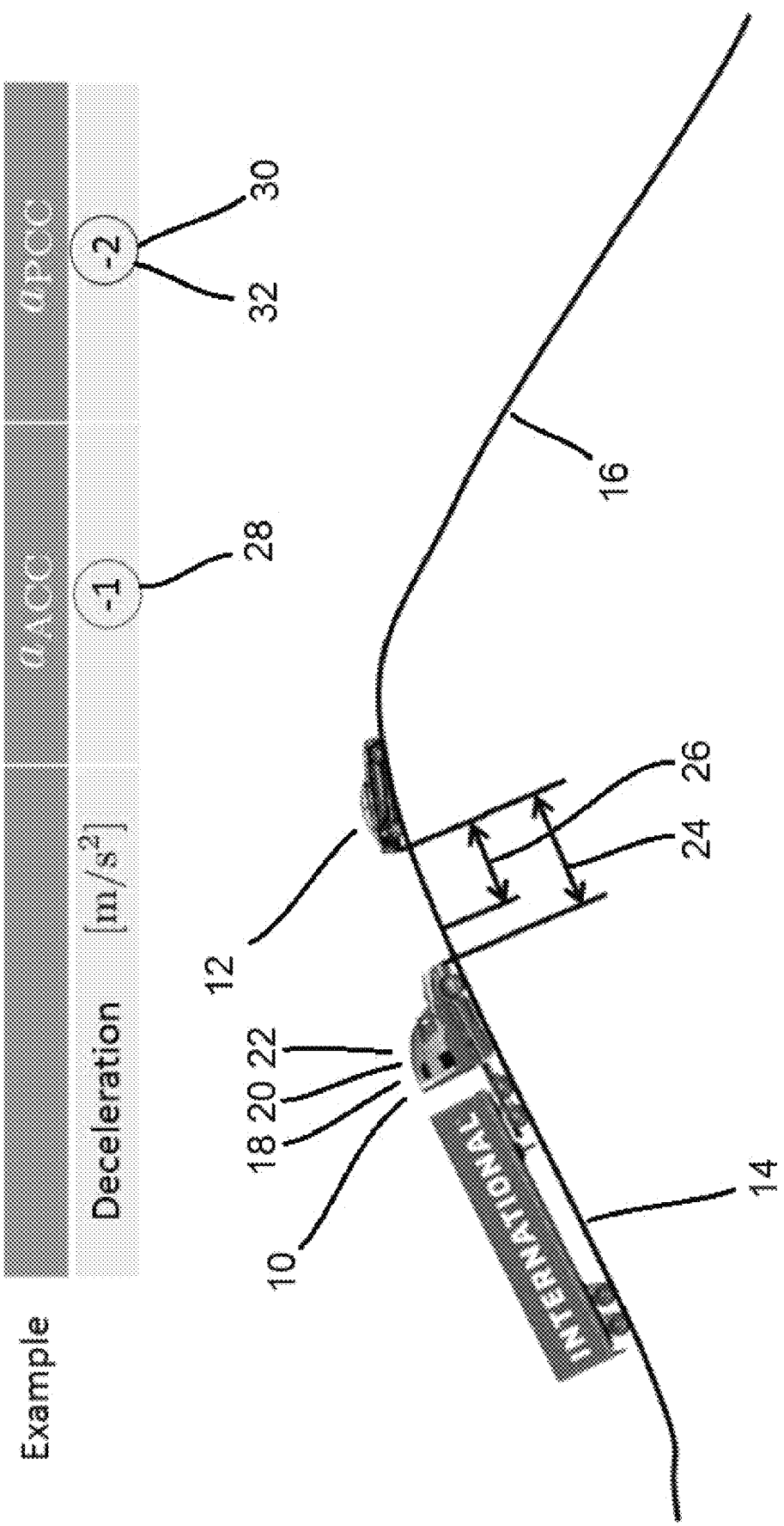

COORDINATING APPARATUS AND METHOD BETWEEN ADAPTIVE CRUISE CONTROL AND PREDICTIVE CRUISE CONTROL

BACKGROUND

This disclosure relates to vehicle speed control systems.

RELATED ART

Adaptive Cruise Control (ACC) is a cruise control advanced driver-assistance system for road vehicles that automatically adjusts vehicle speed to maintain a safe distance from vehicles ahead. Control is based on sensor information from on-board sensors. Such systems may use radar or laser sensors, and/or cameras. ACC causes the vehicle to decelerate when it detects that the vehicle is approaching another vehicle ahead, and causes the vehicle resume a set speed when traffic allows. ACC technology impacts driver safety and convenience as well as increasing road capacity by maintaining optimal separation between vehicles and reducing driver errors. Single radar systems are the most common. Systems involving multiple sensors use either two similar hardware sensors, or one central long range radar coupled with two short radar sensors placed on the corners of the vehicle. Binocular computer vision systems have front-facing video cameras mounted on either side of the rear view mirror and use digital processing to extract depth information from the parallax between the two camera views.[1]

[1] *Adaptive Cruise Control*. 1 Mar. 2021. Retrieved 2 Mar. 2021. https://en.wikipedia.org/wiki/Adaptive_cruise_control Predictive Cruise Control (PCC) modifies vehicle speed based on predictions of the behavior of other vehicles and/or based on adapting vehicle speed to account for roadway and/or geographic features. Such systems can make earlier, more moderate adjustments to the speed of the vehicle having the PCC system, thereby improving safety and passenger comfort. Such systems can further modify vehicle speed to maximize fuel economy in view of such roadway and/or geographic features. One example of PCC functionality is to predict the likelihood of a vehicle in a neighboring lane moving in front of the controlled vehicle.[2]

[2] Id.

It is known to give ACC priority over PCC, so that in the event of conflicting commands from ACC and PCC algorithms, the speed commanded by the ACC system takes priority. It is also known to integrate ACC and PCC systems by way of short horizon optimization. A problem with short horizon optimization, however, is that it usually relies on accurate predictions and extensive computation. *Cruising System on Highways with a Varying Slope*, IEEE Transactions on Intelligent Transportation Systems, vol. 18, no. 5, pp. 1210-1220, May 2017, for example, discloses a fail-safe or automatic emergency brake feature that is merged with an ACC system.

Accordingly, there is an unmet need for an arrangement and method for simply and effectively merging the reactive driver comfort and safety features of ACC with the proactive fuel economy and safety features of PCC.

SUMMARY

According to one embodiment of the Coordinating Apparatus and Method between ACC and PCC, an ACC system has an ACC algorithm configured to provide an ACC target acceleration or deceleration. A PCC system has a PCC algorithm configured to provide a PCC target acceleration or deceleration. The coordinating apparatus is in communication with the ACC system and with the PCC system, and is configured to apply the lesser acceleration or greater deceleration between the ACC target acceleration or deceleration and the PCC target acceleration or deceleration.

According to another embodiment of the Coordinating Apparatus and Method between ACC and PCC, a vehicle has a Coordinating Apparatus between ACC and PCC. An ACC system has an ACC algorithm configured to provide an ACC target acceleration or deceleration. A PCC system has a PCC algorithm configured to provide a PCC target acceleration or deceleration. The coordinating apparatus is in communication with the ACC system and with the PCC system, and is configured to apply the lesser acceleration or greater deceleration between the ACC target acceleration or deceleration and the PCC target acceleration or deceleration.

According to yet another embodiment of the Coordinating Apparatus and Method between ACC and PCC, a method includes several steps. The first step is configuring an ACC algorithm of an ACC system to provide an ACC target acceleration or deceleration. The second step is configuring a PCC algorithm of a PCC system to provide a PCC target acceleration or deceleration. The third step is arranging the coordinating apparatus to be in communication with the ACC system and with the PCC system. The fourth step is configuring the coordinating apparatus to apply the lesser acceleration or greater deceleration between the ACC target acceleration or deceleration and the PCC target acceleration or deceleration.

DESCRIPTION OF THE DRAWINGS

FIG. 1 is a schematic representation of an embodiment of the Coordinating Apparatus and Method between ACC and PCC of the present disclosure, as described herein.

DETAILED DESCRIPTION

Embodiments described herein relate to a Coordinating Apparatus and Method between ACC and PCC, which may be embodied as both a method and an arrangement. The method and arrangement may be applied to various types of passenger vehicles, commercial vehicles, and recreational vehicles, such as highway or semi-tractors, straight trucks, busses, fire trucks, motorhomes, and etcetera. It is contemplated that the method and arrangement may be applied to vehicles having drivetrains including a diesel, gasoline, or gaseous fuel engine, as well as to vehicles having electric or hybrid electric drivetrains. It is further contemplated that the method and arrangement may be applied to vehicles having manual transmissions, automatic transmissions, automated manual transmissions, continuously variable transmissions, hybrid electric transmissions, and hydraulic transmissions, as non-limiting examples. Embodiments of the Coordinating Apparatus and Method between ACC and PCC may use laser based sensors, single radar sensors, multiple radar sensors, and/or computer vision sensors.

The present method and arrangement continues to employ both ACC and PCC systems, although each system provides a desired acceleration or deceleration, rather than a desired speed. The ACC system provides a desired acceleration or deceleration based on maintaining a safe and comfortable distance from vehicles ahead. The PCC system provides a desired acceleration or deceleration based on upcoming changes in elevation, with the purpose of maximizing fuel economy. The Coordinating Apparatus and Method of the present disclosure, then, seamlessly selects the lower value of the two desired accelerations or decelerations for implementation by a vehicle speed control apparatus, for non-limiting example by a vehicle and/or engine controller. This results in a minimum disturbance to fuel economy resulting from the operation of the ACC and PCC systems.

The Coordinating Apparatus and Method between ACC and PCC of the present disclosure merges the reactive driver comfort and safety features of ACC with the proactive fuel economy and safety features of PCC. The Coordinating Apparatus and Method of the present disclosure is simple and effective, and may be easily implemented in engine and/or vehicle controllers in conjunction with ACC systems having ACC algorithms and with PCC systems having PCC algorithms. The ACC system having an ACC algorithm may be integrated with the Coordinating Apparatus and Method, or may otherwise be an independent ACC system. The PCC system having a PCC algorithm may also be integrated with the Coordinating Apparatus and Method, or may otherwise be an independent PCC system. The Coordinating Apparatus and Method between ACC and PCC of the present disclosure is compatible with future ACC and PCC updates, and with ordinary powertrain updates. No additional tuning of the ACC system or PCC system may be required in order for the Coordinating Apparatus and Method to function.

Turning now to FIG. 1, a vehicle 10 having an embodiment of the Coordinating Apparatus and Method 18 between ACC and PCC of the present disclosure is shown, and in the present example is travelling 80 km/hr. There is a preceding vehicle 12 traveling with a slightly slower speed, for example 75 km/hr. The two vehicles are presently separated by an actual time gap 24 of four seconds, and are traveling along an uphill stretch of roadway 14, with a downhill stretch of roadway 16 coming up. The vehicle 10 is equipped with an ACC system 20 having an ACC algorithm, which may again be integrated with the Coordinating Apparatus and Method 18, or may otherwise be an independent ACC system 20. The vehicle 10 is further equipped with a PCC system 22 having a PCC algorithm, which may again be integrated with the Coordinating Apparatus and Method 18, or may otherwise be an independent PCC system 22.

The ACC system 20 detects the preceding vehicle 12 and the ACC algorithm of the ACC system 20 commands an ACC target acceleration or deceleration 28, in this case being a mild deceleration, for example a 1 m/s$^2$ deceleration. Detection of the preceding vehicle 12 may again be by way of laser based sensors, single radar sensors, multiple radar sensors, and/or computer vision sensors. The ACC target acceleration or deceleration 28 is calculated to maintain a safe and reasonable desired time gap 26, for example a three second time gap. The PCC system 22 determines that there is an uphill stretch of roadway 14 followed by a downhill stretch of roadway 16 ahead. Determination that there is an uphill stretch of roadway 14 followed by a downhill stretch of roadway 16 by the PCC system 22 may be by way of ground or satellite positioning systems in conjunction with detailed mapping databases and/or direct sensing.

On the basis of the upcoming downhill stretch of roadway 16 ahead, the PCC algorithm of the PCC system 22 commands a PCC target acceleration or deceleration 30, in this case being a slightly more aggressive deceleration, for example a 2 m/s$^2$ deceleration. The PCC target acceleration or deceleration 30 is calculated to lower the speed at which the vehicle 10 crests the hill, thereby maximizing fuel economy and safety, and minimizing the potential for excessive speed and/or brake wear as the vehicle 10 traverses the downhill stretch of roadway 16. Known systems apply the ACC target acceleration or deceleration 28 as a simple matter of priority on the basis of the detected preceding vehicle 12. The Coordinating Apparatus and Method 18 between ACC and PCC of the present disclosure, however, then applies the lesser acceleration or greater deceleration between the ACC target acceleration or deceleration 28 and the PCC target acceleration or deceleration 30, which then becomes the Coordinating Apparatus and Method target acceleration 32, and is implemented by the vehicle speed control apparatus, for non-limiting example by a vehicle and/or engine controller.

While the Coordinating Apparatus and Method between ACC and PCC has been described with respect to at least one embodiment, the Coordinating Apparatus and Method between ACC and PCC can be further modified within the spirit and scope of this disclosure, as demonstrated previously. This application is therefore intended to cover any variations, uses, or adaptations of the Coordinating Apparatus and Method between ACC and PCC using its general principles. Further, this application is intended to cover such departures from the present disclosure as come within known or customary practice in the art to which the disclosure pertains and which fall within the limits of the appended claims.

What is claimed is:

1. A Coordinating Apparatus between Adaptive Cruise Control (ACC) and Predictive Cruise Control (PCC), comprising:
   an ACC system having an ACC algorithm configured to provide an ACC target acceleration or deceleration;
   a PCC system having a PCC algorithm configured to provide a PCC target acceleration or deceleration; and
   the coordinating apparatus being in communication with the ACC system and with the PCC system, and being configured to apply the lesser acceleration or greater deceleration between the ACC target acceleration or deceleration and the PCC target acceleration or deceleration, wherein:
   the coordinating apparatus being configured to apply the lesser acceleration or greater deceleration by way of a vehicle speed control apparatus.

2. The Coordinating Apparatus of claim 1, wherein:
   the vehicle speed control apparatus further comprising a vehicle engine controller.

3. The Coordinating Apparatus of claim 1, wherein:
   the ACC algorithm of the ACC system being further configured to provide an ACC target acceleration or deceleration based on maintaining a target distance from vehicles ahead.

4. The Coordinating Apparatus of claim 1, wherein:
   the PCC algorithm of the PCC system being further configured to provide a PCC target acceleration or deceleration based on upcoming changes in elevation and maximizing fuel economy.

5. The Coordinating Apparatus of claim 1, wherein:
   the ACC system having an ACC algorithm being integrated with the coordinating apparatus.

6. The Coordinating Apparatus of claim 1, wherein:
   the PCC system having a PCC algorithm being integrated with the coordinating apparatus.

7. A vehicle having a system for coordinating between ACC and PCC, comprising:
   an ACC system having an ACC algorithm configured to provide an ACC target acceleration or deceleration;
   a PCC system having a PCC algorithm configured to provide a PCC target acceleration or deceleration;

a coordinating controller configured to receive signals representative of the ACC target acceleration or deceleration and the PCC target acceleration or deceleration; and being configured to send a signal representative of the lesser acceleration or greater deceleration between the ACC target acceleration or deceleration and the PCC target acceleration or deceleration; and a vehicle speed controller being configured to receive signals from the coordinating controller to apply the lesser acceleration or greater deceleration.

8. The vehicle of claim 7, wherein:

the ACC algorithm of the ACC system being further configured to provide an ACC target acceleration or deceleration based on maintaining a target distance from vehicles ahead.

9. The vehicle of claim 7 wherein the coordinating controller and the vehicle speed controller are a common controller.

10. The vehicle of claim 7, wherein:

the PCC algorithm of the PCC system being further configured to provide a PCC target acceleration or deceleration based on upcoming changes in elevation and maximizing fuel economy.

11. The vehicle of claim 7, wherein:

the ACC system having an ACC algorithm being integrated with the coordinating controller.

12. The vehicle of claim 7, wherein:

the PCC system having a PCC algorithm being integrated with the coordinating controller.

13. A Method of Coordinating between ACC and PCC, comprising the steps of:

configuring an ACC algorithm of an ACC system to provide an ACC target acceleration or deceleration;

configuring a PCC algorithm of a PCC system to provide a PCC target acceleration or deceleration;

arranging the coordinating controller to be in communication with the ACC system and with the PCC system;

configuring the coordinating controller to receive signals representative of the lesser acceleration or greater deceleration between the ACC target acceleration or deceleration and the PCC target acceleration or deceleration and;

configuring a vehicle speed controller to receive signals from the coordinating controller to apply the lesser acceleration or greater deceleration.

14. The method of claim 13, further comprising the steps of:

integrating the ACC system having an ACC algorithm with the coordinating controller.

15. The method of claim 13, further comprising the steps of:

integrating the PCC system having a PCC algorithm with the coordinating controller.

* * * * *